(12) United States Patent
Whikehart (10) Patent No.: US 10,789,844 B1
(45) Date of Patent: Sep. 29, 2020

(54) SYSTEM AND METHOD FOR AUTOMATED PARKING AVAILABILITY SEARCH INCLUDING VEHICLE CHARACTERISTICS

(71) Applicant: VISTEON GLOBAL TECHNOLOGIES, INC., Van Buren Township, MI (US)

(72) Inventor: John William Whikehart, Milford, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 16/405,024

(22) Filed: May 7, 2019

(51) Int. Cl.
*G08G 1/00* (2006.01)
*G08G 1/14* (2006.01)
*G01C 21/36* (2006.01)

(52) U.S. Cl.
CPC ......... *G08G 1/143* (2013.01); *G01C 21/3685* (2013.01); *G08G 1/148* (2013.01)

(58) Field of Classification Search
CPC ..... G08G 1/143; G08G 1/148; G01C 21/3685
See application file for complete search history.

(56) References Cited

U.S. PATENT DOCUMENTS

| | | | | |
|---|---|---|---|---|
| 2002/0161520 A1* | 10/2002 | Dutta | ............. | G01C 21/26 701/469 |
| 2009/0204600 A1* | 8/2009 | Kalik | ............. | G06Q 30/02 |
| 2012/0092190 A1* | 4/2012 | Stefik | ............. | G08G 1/14 340/932.2 |
| 2014/0376769 A1* | 12/2014 | Bulan | ............. | G06K 9/00771 382/103 |
| 2015/0279213 A1* | 10/2015 | Balter | ............. | G08G 1/144 705/13 |
| 2016/0214357 A1* | 7/2016 | Larsson | ............. | B32B 27/306 |
| 2018/0114438 A1* | 4/2018 | Rajagopalan | ............. | G08G 1/015 |
| 2018/0218604 A1* | 8/2018 | Astigarraga | ............. | G01C 21/3492 |

\* cited by examiner

*Primary Examiner* — Phung Nguyen
(74) *Attorney, Agent, or Firm* — Dickinson Wright PLLC (57) ABSTRACT

A parking availability system and method are provided. The system includes a vehicle information module that may be cloud-based to store characteristics of the vehicle and/or the driver/occupant(s). A parking module that may be cloud-based receives a selected destination and receives the characteristics of the vehicle and/or driver/occupant(s) from the vehicle information module. An infrastructure communication module receives the selected destination from the parking module and communicates with the selected destination to request parking availability information. The parking module determines, based on the parking availability information and the characteristics, whether there is parking available for the vehicle at the selected destination. The parking module generates alternate parking locations within a predetermined radius of the selected destination and provides the alternate parking locations to the infrastructure communications module for the infrastructure communications module to communicate with the parking locations to request parking availability information for the alternate parking locations.

19 Claims, 6 Drawing Sheets

SYSTEM AND METHOD FOR AUTOMATED PARKING AVAILABILITY SEARCH INCLUDING VEHICLE CHARACTERISTICS

BACKGROUND

Vehicles are often parked (e.g., stored), when they are not in use. Often vehicles are parked in specialized facilities where a large number of vehicles are parked at a single destination, such as an airport, a shopping center, or a business. It should be understood that the terms "destination", "location" and "facility" are used interchangeably herein and may apply to a specific or a general place. For example and without limitation, a specific place may be an airport (e.g., LAX), while a general place may be a city (e.g., Los Angeles). In some instances, the specialized facilities include a parking structure, which may include multiple floors, each of which may accommodate a number of vehicles or a parking lot or car park which encompasses a large surface area to accommodate a number of vehicles. Parking spaces in an urban area, where land is at a premium, are in high demand. A wide variety of vehicles are presently in use that have a broad set of characteristics (e.g., dimensions). As a result, some vehicles fit into standard parking spaces, while others require specialized parking spaces to accommodate their unique characteristics (e.g., wheelchair lift), and/or the occupants of the vehicles may require specialized parking spaces to accommodate their unique characteristics (e.g., additional space for loading/unloading, proximity to an entrance/exit, a well-lit area, preferred entrance).

SUMMARY

A parking availability system and method is provided which includes a vehicle information module that stores at least the characteristics of the vehicle (e.g., a manually operated vehicle, a semi-autonomous vehicle, or a fully autonomous vehicle). The parking availability system includes a vehicle information module that may be cloud based for storing characteristics of the vehicle and/or occupants of the vehicle. The parking availability system includes a parking module that may be cloud based for receiving a selected destination and for receiving the characteristics from the vehicle information module. The parking availability system also includes an infrastructure communication module for receiving the selected destination from the parking module and for communicating with the selected destination to request parking availability information, wherein the parking module determines, based on the parking availability information and the characteristics, whether there is parking available for the vehicle at the selected destination.

A method for determining parking availability for a vehicle (e.g., a manually operated vehicle, a semi-autonomous vehicle, or a fully autonomous vehicle), at a selected destination is also provided. The method includes the steps of: receiving a destination selection (e.g., a city, town, shopping area, airport), by a parking module and generating, by the parking module, a request to determine the availability of parking at the selected destination that may include multiple locations (e.g., a surface parking lot, street parking, a parking structure, valet parking, secure parking). The method proceeds with sending, by the parking module, the request to an infrastructure communication module and communicating, by the infrastructure communication module, with the selected destination to determine the availability of parking at the selected destination. The method further proceeds with determining, based on the availability of parking at the selected destination and characteristics stored in a vehicle information module, whether there is parking for the vehicle at the selected destination.

A non-transient computer readable medium containing program instructions for causing a computer to form the method of determining parking availability for a vehicle may include receiving a selected destination by a parking module. The non-transient computer readable medium may also contain program instructions for generating, by the parking module, a request to determine the availability of parking at the selected destination. The non-transient computer readable medium may also contain program instructions for sending, by the parking module, the request to an infrastructure communication module. The non-transient computer readable medium may also contain program instructions for communicating, by the infrastructure communication module, with the selected destination to determine the availability of parking at the selected destination. The non-transient computer readable medium may also contain program instructions for determining, based on the availability of parking at the selected destination and vehicle characteristics stored in a vehicle information module, whether there is parking for the vehicle at the selected destination.

BRIEF DESCRIPTION OF THE DRAWINGS

Further details, features and advantages of designs of the disclosure result from the following description of embodiment examples in reference to the associated drawings.

DETAILED DESCRIPTION

Recurring features are marked with identical reference numerals in the figures. A parking availability system (PAS) 10 and a method of operation for the PAS 10 for a vehicle 12 is disclosed. It should be understood that the vehicle 12 may include several operating modes, such as, but not limited to, manual (e.g., human driver/occupant), autonomous, or semi-autonomous and that the terms "vehicle" and "autonomous vehicle" are used interchangeably herein.

As generally shown in FIGS. 1-4, a variety of vehicles with different characteristics that impact parking are provided. Some of the characteristics of the vehicles are permanent and others are temporary. For example, a vehicle (e.g., disabled van), 12 includes a selectively-deployable side ramp 16 that may extend into a disabled parking area

14. If the vehicle 12 is being operated by a disabled person that needs to use the side ramp 16, then locating a destination with the disabled parking area 14 is required. However, if the vehicle 12 is being operated/used by a person that does not require use of the side ramp 16, then a conventional (e.g., typical), parking location 20 (see, FIGS. 2-4) is appropriate. Conversely, if the vehicle 12 is retrieving a disabled person (e.g., driver/occupant), at the selected destination, then the disabled parking area 14 is an appropriate parking space.

Figure 1:
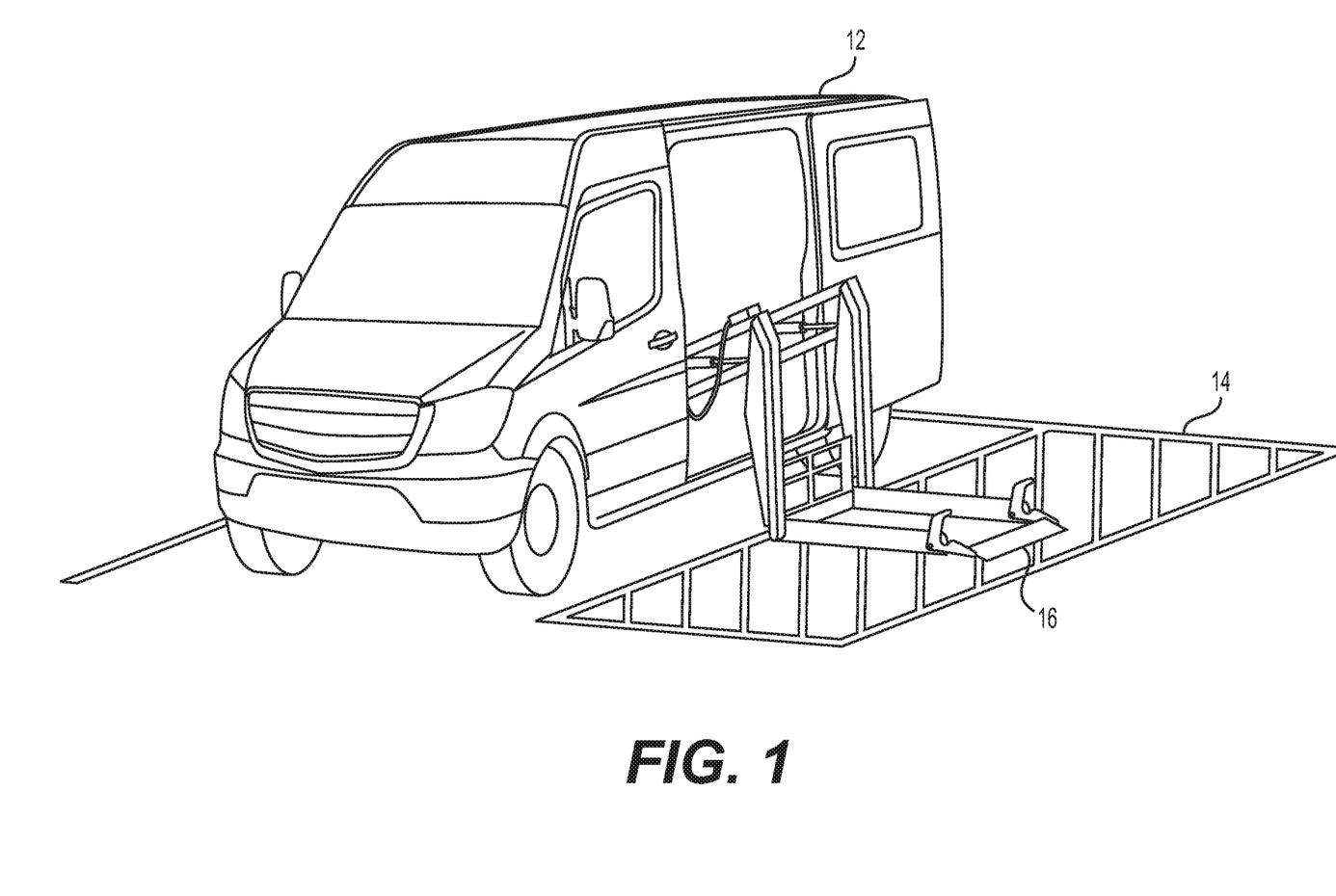
FIG. 1 is a perspective view of a vehicle equipped with a wheelchair ramp/lift and including a parking availability system in accordance with the present disclosure.
Figure 2:
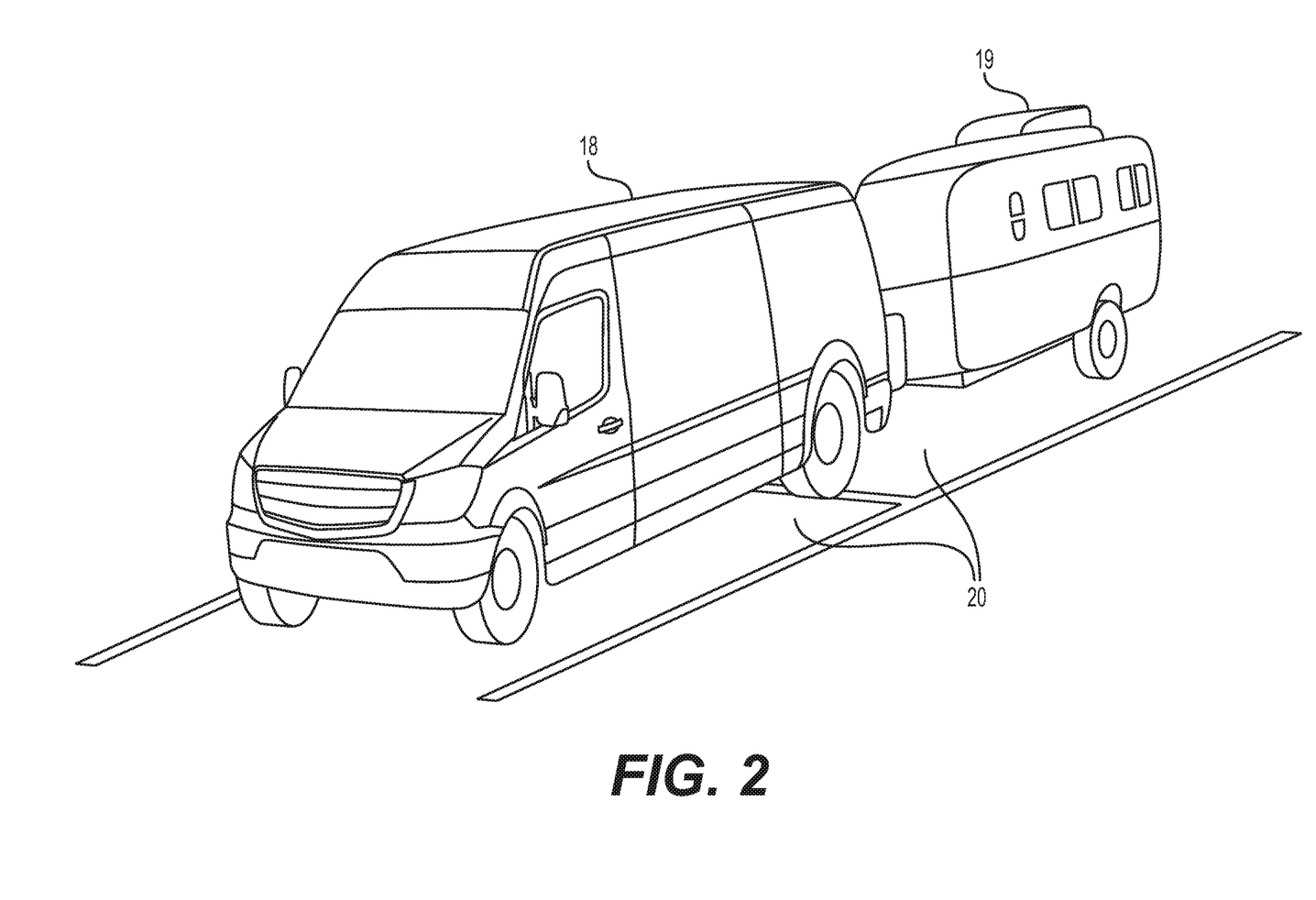
FIG. 2 is a perspective view of a vehicle equipped with a trailer and including a parking availability system in accordance with the present disclosure.

Another vehicle, a recreational vehicle (RV) 18, as shown in FIG. 2, includes a trailer 22. However, the RV 18 is shown parked over two adjacent typical parking spaces 20. The RV 18 could fit in a single typical parking space 20 if the trailer 22 were absent (e.g., not connected to the RV 18), in this example. The RV 18 with the trailer 22 may be restricted to specialized parking spaces at a selected destination, such as those with sufficient maneuvering space so that the RV 18 may turn with the trailer 22 and avoid contact with other vehicles and/or obstacles (e.g., light posts). Additionally, as configured in FIG. 2, the RV 18 with trailer 22 requires two adjacent, in-line conventional parking spaces 20. Two conventional parking spaces 20 next to each other, but not in-line, may not be appropriate for the RV 18 with trailer 22 (unless the RV 18, within the constraints of the selected destination parking, may unhook and leave trailer 22 in one parking space 20 and then park in the adjacent parking space 20). The selected destination may not permit such a parking arrangement.

Figure 3:
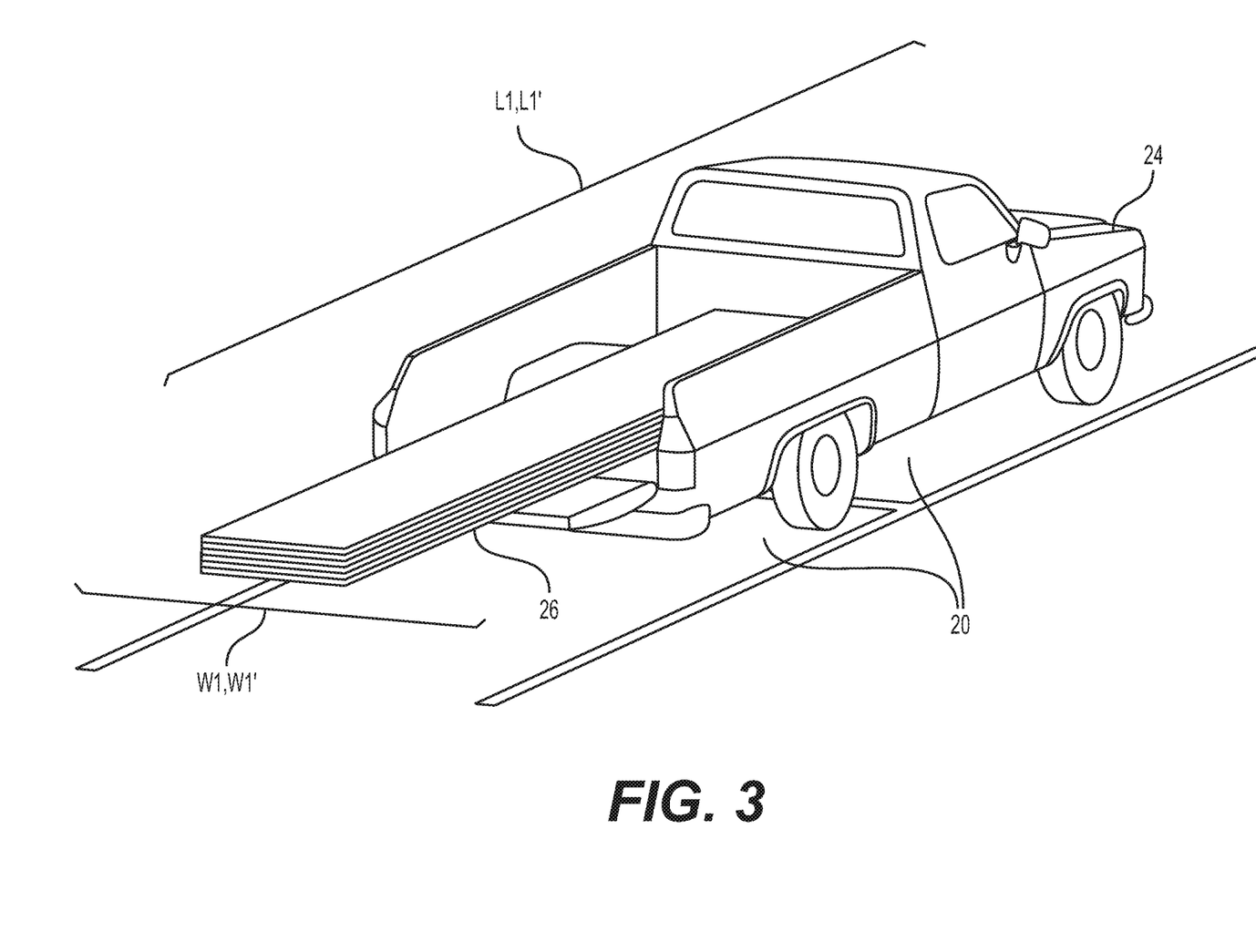
FIG. 3 is a perspective view of a vehicle with a cargo load extending beyond the exterior dimensions of the vehicle and including a parking availability system in accordance with the present disclosure.

A pickup truck 24, as shown in FIG. 3, includes a cargo 26. As in the example of the RV 18, the pickup truck 24 is shown parked over two parking spaces 20 due to the length of the cargo 26. The cargo 26 could be, for example, lumber, a boat, or another item or items that cannot be contained within the pickup truck 24. The pickup truck 24 is limited, based on its total length L1 (vehicle length plus cargo length extending from the vehicle) on the type and configuration of parking spaces 20 that are suitable. Additionally, due to the total length L1, the pickup truck 24 may not be able to maneuver within the parking of the selected destination without contacting other vehicles and/or obstacles. It should be understood that other dimensions of the pickup truck (in this example) may include cargo, such as the height and/or width. Thus, similarly as with the RV 18, suitable parking at the selected destination may not be available due to the physical characteristics of the pickup truck 24 with the cargo 26.

Figure 4:
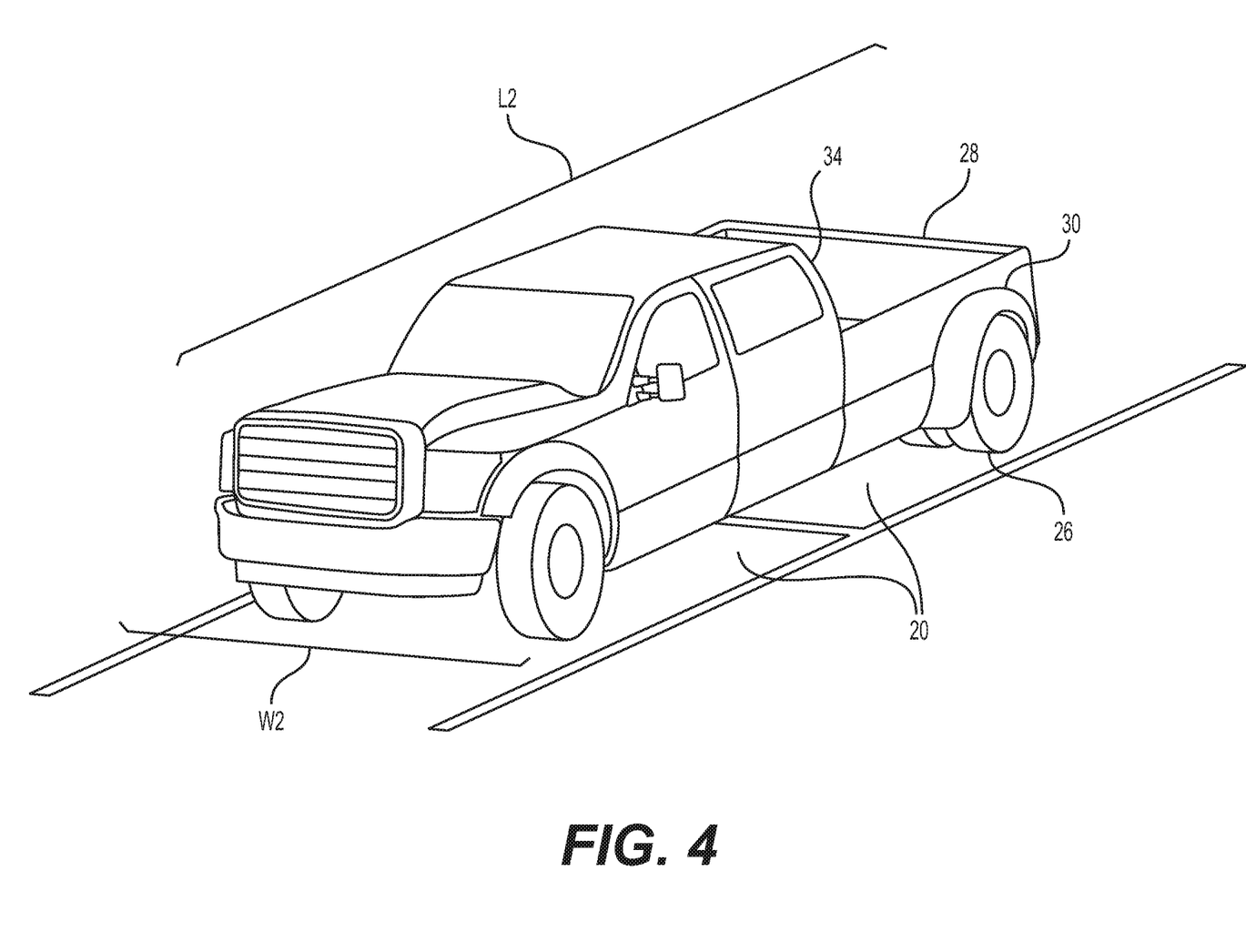
FIG. 4 is a perspective view of a vehicle equipped with dual rear wheels and including a parking availability system in accordance with the present disclosure.

A dual rear wheel (DRW) pickup truck 28, as shown in FIG. 4, includes fender flares 30 that enclose the dual rear wheels 32 of the DRW pickup truck 28. Due to the fender flares 30 and the dual rear wheels 32, the DRW pickup truck 28 is wider W2 than the single rear wheel pickup truck 24 (see, e.g., FIG. 3). Additionally, the DRW pickup truck 28 includes a crew cab 34, which increase a total length L2 of the DRW pickup truck 28 even more than the pickup truck 24. Due to the width W2 and the length L2, the DRW pickup truck 28 may not fit in a single parking space 20, and is shown in FIG. 4 occupying two in-line parking spaces 20. Similarly to the RV 18 and the pickup truck 24, parking for the DRW pickup truck 28 requires a pair of in-line parking spaces 20 (or a single double-length space, an open area) to accommodate the DRW pickup truck 28. However, the DRW pickup truck 28 may include a wider-than-standard turning radius which complicates maneuvering within the parking space 20 of the selected destination. For example, the DRW pickup truck 28 may be able to maneuver into the parking space 20 but exiting the parking space 20 may prove difficult. Thus, suitable parking at the selected destination may not be available due to the physical characteristics of the DRW pickup truck 28 with fender flares 30, dual rear wheels 32, and/or a crew cab 34.

It should be noted that PAS 10 may be configured to determine whether the vehicle 12 is prohibited (based on its present dimensions) from entering a selected destination or whether vehicle 12 may enter the selected destination but may require operator intervention in order to maneuver to the parking space 20. For example and without limitation, the PAS 10 may be configured with a "safety zone" or "cushion" outside the presently measured dimensions of the vehicle 12 that may prevent the PAS 10 from determining that the selected destination and/or the parking space 20 is safe to enter. As a result, the PAS 10 is configured to perform calculations based on the present dimensions of the vehicle 12 and/or the parking space 20 and the route to the parking space 20 at the selected destination. However, the PAS 10 may be configured to delegate the final maneuvering of the vehicle 12 to the operator but provide information to the operator about the "safety zone" or "cushion". For example, a light post may intrude on the "safety zone" from the side, a tree or an electrical service line may intrude from above. As a result, the operator may make the final decision and decide to maneuver to the parking space 20 or direct the PAS 10 to the next available parking space 20 or another search for a suitable parking space 20 (given the dynamic nature of parking).

All vehicles, including the disabled van 12, the RV 18, the pickup truck 24, and the DRW pickup truck 28 require storage when not in use. In many instances, storage is defined as parking, such as a part of a particular selected destination (e.g., an airport, office), or as a selected destination in itself (e.g., temporary storage for autonomous vehicles, a parking structure). When a selected destination is chosen by a driver/occupant for the vehicle, typically the directions include one or more paths to the selected destination but do not include navigation to an exact parking location (space) for the vehicle. The driver/occupant is left to find a parking space for the vehicle which may be challenging given the location and/or time at the particular location. For example, a busy airport, an urban parking structure during a workday, a shopping center during holiday season. It is conceivable that the driver of the vehicle may spend more time (and energy/fuel) looking for a parking space than the actual drive time to the selected destination. This situation can be aggravated further by vehicles and/or driver/occupant(s) with unique characteristics (oversize, disabled, trailer-towing vehicle, and/or disabled person, pregnant person, elderly person, etc.).

Parking facilities, such as a parking structure or even parking lots (e.g., car parks), can have size and/or height restrictions in effect. The restrictions can include an overhead beam that can contact the roof of an over-tall vehicle at the entrance. The entrance may be of limited width, such that an over-wide vehicle will not fit. These restrictions may not be known to the driver when the selected destination is selected, requiring the driver to seek an alternative parking facility and causing an inconvenience to the driver. Additionally, time and energy is consumed by the driver and the vehicle searching for the alternative parking facility without size and/or height restrictions.

Other parking facilities can have specialized parking spaces for disabled vehicle use. In some cases, no parking spaces are available due to unusual and/or short-lived situations, such as a temporary parking facility (e.g., a field), piles of snow covering such spaces, or construction impacting the disabled parking spaces. In an alternative embodiment, the operator and/or another source (e.g., satellite images, video images, information provided via the Internet), may provide information to the PAS 10 regarding such transitory situations, and the PAS 10 may be configured to update its search for suitable parking spaces accordingly. Additionally, the number of disabled parking spaces are limited, and their types and sizes can vary greatly. Some disabled parking spaces, for example, provide additional space on one or both sides, or front or rear of the vehicle, for deployment of a wheelchair ramp. A disabled parking space with a side ramp designated area is not particularly useful for a vehicle with a rear ramp that may have to deploy in a vehicle traffic lane or be prevented from deploying due to other obstructions. Time and energy is consumed by the driver and the vehicle searching for an alternative parking facility with a suitable disabled parking space.

Some parking facilities have non-standard parking spaces, such as those for compact (e.g., small), vehicles or for electric vehicles (that include charging facilities). A typically-sized vehicle, such as a sport utility vehicle (SUV) or a pickup truck will not fit in one of these parking spaces and can cause an obstruction to traffic flow in the parking facility if parked in a compact parking space. Also, a non-electric vehicle parking in an electric vehicle space is undesirable and could result in the offending vehicle being towed and/or ticketed. Time and energy is consumed by the driver and the vehicle searching for an alternative parking facility with suitable non-standard parking spaces.

Parking facilities may include restrictions on the length of vehicles that are permitted to use (or enter) the facility. For example, vehicles towing trailers, recreational vehicles (RVs), long wheelbase vehicles such as crew cab pickup trucks, limousines, and buses may not be suitable for some parking facilities. These parking facilities may be designed such that long vehicles will have difficulty maneuvering in the parking facilities, such as turning corners, using ramps, and avoiding structure pillars (as in a parking structure). Time and energy is consumed by the driver and the vehicle searching for an alternative parking facility suitable for long vehicles.

According to an aspect of the disclosure, the PAS 10 of the exemplary vehicle 12 is configured to adapt to changing conditions at the selected destination 48. While vehicle 12 is described herein as the exemplary vehicle 12, it is contemplated that the RV 18, the pickup truck 24, and the DRW pickup truck 28 as well as other types of vehicles (e.g., buses, trams, forklifts, boats, aircraft or any device that can transport objects), may be configured with the PAS 10. For example, when the vehicle 12 arrives at the selected destination 48 (either driver-controlled or autonomous-controlled) the parking location may be unavailable or otherwise inappropriate for the vehicle 12 to occupy. The parking location may be blocked by a delivery vehicle, one or more pedestrians, weather-related obstacle (e.g., snow piles, flood water). Thus, it would be unsafe for the vehicle 12 to enter the parking location. The parking location, while suitable for the vehicle 12, may include other challenges or hazards that may affect the ability of the vehicle 12, the driver/occupant, or cargo to enter and/or exit the vehicle 12. For example, in a multi-level parking structure (see, FIG. 5), it is common to encounter a large number of interior support columns. Often these support columns impede on parking locations and may make maneuvering as well as entering/exiting the vehicle 12 difficult for the driver/occupant or to load/unload cargo from or into the vehicle 12. Additionally and alternatively, the parking location may be difficult to access due to the presence of over-sized vehicles and/or poorly parked vehicles in adjacent parking locations that the vehicle 12 is directed to by the PAS 10. The PAS 10, when encountering these exemplary situations in an autonomous vehicle 12 or in a driver/occupant controlled vehicle 12 chooses another parking location based on communication with the selected destination 48 or other destinations nearby the present location of the vehicle 12.

According to an aspect of the disclosure, the PAS 10 is configured to locate parking at a selected destination 48 based on a parking request would be desirable. The PAS 10 can communicate with the selected destination 48, such as by using the cloud/Internet, to determine if parking is available. If the selected destination 48 replies to the PAS 10 request that parking is available, the PAS 10 determines, based on the characteristics of the vehicle and/or driver/occupant, whether any of the available parking is suitable for the vehicle. The PAS 10 communicates with the selected destination 48 during the travel time to the selected destination 48, based on the selected parking request, to continually or periodically determine the status of parking at the selected destination 48.

Figure 5:
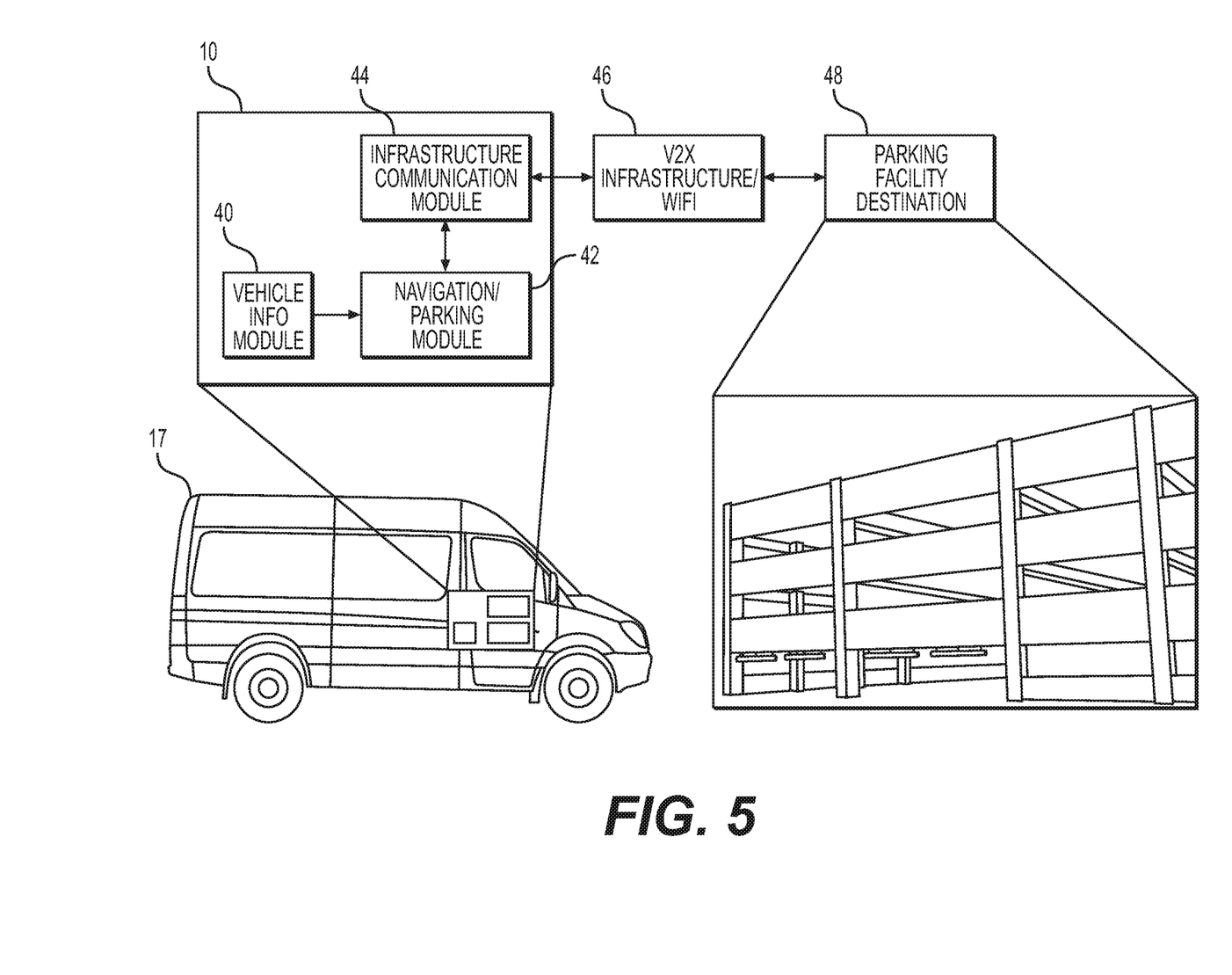
FIG. 5 is a diagrammatic view of a parking availability system in accordance with the present disclosure.

As shown in FIG. 5, the PAS 10 according to an aspect of the disclosure is provided. The PAS 10 includes the vehicle information module 40, the parking module 42, and the infrastructure communication module 44. The vehicle information module 40 stores characteristics of the vehicle 12 and/or driver/occupant(s). The disabled van 12 is used in an exemplary manner, but it should be understood that other vehicles, such as, but not limited to, the RV 18, the pickup truck 24, and/or the DRW pickup truck 28 are contemplated to include the PAS 10. The parking module 42 receives a selected destination 48 as provided by a driver/occupant, such as, but not limited to, from an audio request 50, a mobile device 52, the cloud/Internet 54, or a user interface (UI, not shown) and receives the characteristics of the vehicle 12 and/or the driver/occupant(s) from the vehicle information module 40. The infrastructure communication module 44 receives the selected destination 48 from the parking module 42 and communicates with the selected destination 48 via wireless communication 46 (e.g., the Internet or other communication methods, including vehicle-to-infrastructure (V2I), vehicle-to-everything (V2X), and/or Wi-Fi), to request parking availability information. The parking module 42 determines, based on the parking availability information and the characteristics of the vehicle 12 and/or the driver/occupant(s), whether there is parking available for the vehicle 12 at the selected destination 48.

According to an aspect of the disclosure, the PAS 10 is configured in the vehicle 12. The driver/occupant inputs the selected destination 48 into the PAS 10. The selected destination 48 is selected by the driver/occupant based at least on the prior knowledge of the selected destination 48 held by the driver/occupant. For example, the driver/occupant chooses a local airport as the selected destination 48. Additionally and alternatively, the driver/occupant uses a mobile device 52 (e.g., a mobile phone), to search for the selected destination 48 and inputs the selected destination 48 into the PAS 10 via a user interface (not shown) or sends the selected destination 48 to the PAS 10 electronically, such as, but not limited to, via wireless communication (e.g., Wi-Fi).

According to an aspect of the disclosure, the PAS 10 is configured in the vehicle 12 and stores one or more previously selected destinations 48 received by the driver/occupant. The PAS 10 retrieves one or more previously selected destination 48 from a memory (not shown) that may be integrated within PAS 10 or separate from PAS 10, such as within the vehicle 12 and/or external to vehicle 12 (e.g., a remote system or "cloud" system). The PAS 10 determines, based on the driver/occupants of the vehicle, which selected destinations 48 to retrieve from a database of previously selected destinations 48. For example, the driver/occupant is identified by the mobile device 54 used by the driver/occupant that connects to (e.g., is detected by) the PAS 10 and/or the vehicle 12. Additionally and alternatively, the PAS 10 and/or the vehicle 12 uses an audio identification, an imaging device (not shown), or other identification system (e.g., other biometric, key fob, application), to determine the identity of the driver/occupant(s) and retrieve selected destinations 48 based on the determination. For example, the PAS 10 displays previously selected destinations 48 including "office", "home", and "school" based on the identity of the driver/occupant.

According to an aspect of the disclosure, the PAS 10 of the vehicle 12 is configured to interface with a navigation system (not shown) of the vehicle 12. The navigation system of the vehicle 12 may be configured as a turn-by-turn navigation system to provide a driver/occupant with real-time navigation (e.g., driving), instructions. The navigation system, the PAS 10, or another system suggests one or more selected destinations 48 (such as based on pre-selected destinations 48 or frequently selected destinations 48 ("favorites")). For example, based on the time and day, the suggestion is "office". The driver/occupant chooses the suggested destination 48, one of the pre-selected/frequent destinations 48, or inputs a new selected destination 48 into the PAS 10. It should be understood that the navigation system is optional (e.g., may be used in conjunction with/integrated with but not required), with respect to the PAS 10.

According to an aspect of the disclosure, the PAS 10 is configured in the autonomous vehicle 12. Additionally and alternatively, the autonomous vehicle 12 is includes at least a partially autonomous mode (e.g., semi-autonomous). The driver/occupant inputs the selected destination 48 into the PAS 10 of the autonomous vehicle 12. The selected destination 48 selects by the driver/occupant based at least on the prior knowledge of the selected destination 48 held by the driver/occupant. For example, the driver/occupant chooses a school as the selected destination 48. Additionally and alternatively, the driver/occupant uses the mobile device 52 (e.g., a mobile phone), to search for the selected destination 48 and inputs the selected destination 48 into the PAS 10 via the user interface and/or sends the selected destination 48 to the PAS 10 electronically, such as, but not limited to, via wireless communication (e.g., Wi-Fi). Additionally and alternatively, the driver/occupant inputs the selected destination 48 via an audio instruction 50 (e.g., the driver/occupant tells the PAS 10 the selected destination 48).

According to an aspect of the disclosure, the PAS 10 is configured in the autonomous vehicle 12 and stores one or more previously selected destinations 48 received by the driver/occupant. The PAS 10 retrieves previously selected destinations 48 from a memory (not shown) that may be integrated within PAS 10 or separate from PAS 10, such as within autonomous vehicle 12 and/or external to autonomous vehicle 12 (e.g., a remote system or "cloud" system). The PAS 10 determines, based on the driver/occupant(s) of the autonomous vehicle 12, which selected destinations 48 to retrieve from the previously selected destinations 48. For example, the driver/occupant is identified by the mobile device 52 used by the driver/occupant that connects to the PAS 10 and/or the autonomous vehicle 12. Additionally and alternatively, the PAS 10 and/or the autonomous vehicle 12 uses an imaging device (not shown) or other identification system to determine the identity of the driver/occupant and retrieve selected destinations 48 based on the determination. For example, the PAS 10 displays previously selected destinations 48 including "office", "home", and "school" based on the identity of the driver/occupant.

According to an aspect of the disclosure, the PAS 10 of the autonomous vehicle 12 is configured to interface with a navigation system (not shown) of the autonomous vehicle 12. The navigation system of the autonomous vehicle 12 may be configured as a turn-by-turn navigation system to provide a driver/occupant with real-time navigation (e.g., driving, route information), instructions. The PAS 10 suggests one or more selected destinations 48 (such as based on pre-selected destinations 48 or frequently selected destinations 48). For example, based on the time and day and the driver/occupant, the suggestion is "office". The driver/occupant chooses the suggested destination 48, one of the pre-selected/frequent destinations 48, or inputs a new selected destination 48 into the PAS 10 (e.g., an operating system of the autonomous vehicle 12). Additionally and alternatively, the navigation system of the PAS 10 of the autonomous vehicle 12 may be configured as a destination-focused navigation system to provide the driver/occupant with a simplified navigation interface wherein only the selected destination 48 is provided by the driver/occupant and the navigation system operates the vehicle 12 (such as, but not limited to, if the vehicle 12 is autonomous, semi-autonomous).

According to an aspect of the disclosure, the PAS 10 of the autonomous vehicle 12 is configured to interface with a navigation system (not shown) of the autonomous vehicle 12. The driver/occupant, another remote user, or an application sends the autonomous vehicle 12 to the selected destination 48. In other words, the autonomous vehicle 12 is sent unoccupied (e.g., without a driver/occupant), to the selected destination 48 to retrieve one or more driver/occupants, cargo (e.g., packages, food, pets), or to another selected destination 48. For example, the autonomous vehicle 12 may be sent to a storage facility, a maintenance facility, or set to participate in a ride-sharing program. The parking location at the selected destination 48 is provided to the driver/occupant that sent the empty autonomous vehicle 12 to the selected destination 48 as well as other recipients, such as the driver/occupants at the selected destination 48. The parking location (e.g., where the autonomous vehicle 12 will be located once it arrives at the selected destination 48), is provided to the driver/occupant that sent the autonomous vehicle 12 via an application, such as on a mobile device, that is connected to the autonomous vehicle 12 and/or the selected destination 48. For example, if the parking location at the selected destination 48 is selected/reserved for the autonomous vehicle 12 but for some reason (e.g., another vehicle takes the parking location), it becomes unavailable, an updated parking location is selected and revised navigation and location information is disseminated to the autonomous vehicle 12 and the driver/occupants by the PAS 10.

According to an aspect of the disclosure, the parking module 42 of the PAS 10 includes an electronic payment system (not shown), and based on the determination of available parking by the parking module 42, purchases a parking space(s) 20 at the selected destination 48. Additionally and alternatively, the parking module 42 is configured to reserve a parking space(s) 20 at the selected destination 48.

According to an aspect of the disclosure, the vehicle information module 40 of the PAS 10 is connected to at least one imaging device (not shown) of a vehicle and uses at least one captured image of the vehicle to determine the present exterior dimensions of the vehicle. For example, the pickup truck 24 (see, e.g., FIG. 3) includes the cargo 26 that extends beyond the original exterior dimensions of the pickup truck 24 (e.g., dimensions without the cargo 26). The imaging device of the pickup truck 24 captures at least one image of the pickup truck 24 and the cargo 26 and determines at least the present length (L1) and present width (W2) of the pickup truck 24. The vehicle information module 40 may also determine the height of the pickup truck 24 using a captured image from the imaging device of the pickup truck 24. Additionally and alternatively, the PAS 10 may be configured to access (e.g., connect), with one or more imaging devices at the selected destination. For example, an imaging device may be positioned at the entrance to the parking area of the selected destination, such as a parking structure with a height and/or width restriction. The PAS 10 may use the images generated by the imaging device to determine whether the vehicle 12 at its present dimensions may safely enter the parking area of the selected destination. The PAS 10 may be configured to perform these determinations whether the vehicle 12 is a manually-operated vehicle, a semi-autonomous vehicle, or a fully autonomous vehicle (or if the vehicle 12 may be configured to operate between one or more of these modes). It should be understood that the term "semi-autonomous" is not limited to "half" autonomous but includes the range between manually-operated and fully autonomous modes.

According to an aspect of the disclosure, the vehicle information module 40 of the PAS 10 compares the present exterior dimensions of a vehicle (e.g., the pickup truck 24), to the stored (e.g., previous), exterior dimensions (L1' and W1') of the pickup truck 24 and determines if the present exterior dimensions (L1 and W1) of the pickup truck 24 are different from the stored exterior dimensions (L1' and W1') of the pickup truck 24. The vehicle information module 40 may also compare a stored height of the pickup truck 24 to the present height of the pickup truck 24 using a captured image from the imaging device of the pickup truck 24.

According to an aspect of the disclosure, the parking module 42 of the PAS 10 generates alternate parking locations within a predetermined radius of the selected destination 48. For example, the parking module 42, upon receiving a parking request and confirmation that parking is requested, provide alternate parking locations in a default radius of 1 km from the selected destination 48. The parking module 42 is configured with different radii from the selected destination 48 to provide alternate parking locations, or only the parking available at the selected destination 48 (e.g., a sports stadium). The parking module 42 provides the alternate parking locations within the predetermined radius (if selected) to the infrastructure communication module 44. The infrastructure communication module 44 communicates with the alternate parking locations and requests parking availability information for the alternate parking locations.

According to an aspect of the disclosure, the infrastructure communication module 44 of the PAS 10 provides the parking availability information for the alternate parking locations to the parking module 42. The parking module 42 determines, based at least upon the present characteristics of the vehicle provided by the vehicle information module 40 and the parking availability information provided by the alternate parking locations to the infrastructure communication module 44, whether there is parking available for the vehicle at the alternate parking locations.

According to an aspect of the disclosure, the parking module 42 of the PAS 10 determines, based on the parking information provided by the infrastructure communication module 44, whether there is a charge (e.g., cost), for a parking space at the selected destination 48 and/or the alternate parking locations. Additionally and alternatively, the parking module 42 determines, based on the parking information provided by the infrastructure communication module 44, whether a parking space is reserved at the selected destination 48 and/or the alternate parking locations.

According to an aspect of the disclosure, the parking module 42 of the PAS 10 determines, based on the selected destination 48 and/or the alternate parking locations and the characteristics of the vehicle provided by the vehicle information module 40, whether the vehicle may ingress/egress a parking environment (e.g., parking lot, parking structure, car park), at the selected destination 48 and/or the alternate parking locations in proximity to the selected destination 48 (e.g., a radius of 0.5 km).

According to an aspect of the disclosure, after the PAS 10 has chosen the parking location at the selected destination 48, the PAS 10 determines which entrance to the selected destination 48 provides the least difficult approach and/or departure from the parking location. For example, the parking location is clear of obstacles such as support columns, bollards, dumpsters (e.g., rubbish bins), and/or shipping/receiving areas with heavy truck traffic. Additionally and alternatively, the PAS 10 determines, based on information from the selected destination 48, a parking location that is well-lit (e.g., such as by street lights), includes coverage by surveillance cameras, and/or is patrolled by security personnel.

According to an aspect of the disclosure, the vehicle information module 40 provides the characteristics of the vehicle (e.g., length, width, height, and weight), stored in a memory. The vehicle information module 40 is configured to utilize one or more vehicle system, such as an imaging device, powertrain module, radar and/or other sensors to determine the present characteristics of the vehicle and compares the present characteristics to the stored characteristics to determine if the characteristics of the vehicle have changed. For example, if the cargo 26 is added to the pickup truck 24 (see, e.g., FIG. 3), the length of the pickup truck 24 has changed from L1 to L1' and is determined by the vehicle information module 40 using at least an imaging device of the pickup truck 24. Similarly, using one or more systems of the pickup truck 24, the vehicle information module 40 determines that the weight of the pickup truck 24 has increased due to the cargo 26.

According to an aspect of the disclosure, the PAS 10 (either in the vehicle, in the cloud, or a combination thereof) utilizes one or more images captured by imaging devices of the selected destination 48 to measure the dimensions of the available parking locations of selected destination 48 and to determine the suitability of the parking locations based at least on the vehicle and/or driver/occupant characteristics. For example, the PAS 10 obtains vehicle and/or driver/occupant characteristics from the vehicle information module 40. The characteristics may include the outer dimensions of the vehicle 12 and the number of passengers (driver/occupants) of the vehicle 12. The PAS 10 analyzes images captured from imaging devices of the selected destination 48 (e.g., security cameras, parking location cameras), and uses the captured images to determine whether any suitable parking locations are available at the selected destination 48. The PAS 10 accesses a library of captured images (within the vehicle 12 and/or via the "cloud") and/or imaging devices of the vehicle 12 to determine the present exterior dimensions of the vehicle 12. Additionally and alternatively, the vehicle information module 40 may include a library (e.g., database) and/or baseline vehicle exterior dimensions for the PAS 10 to determine the exterior dimensions of the vehicle 12 and whether suitable parking locations are available at the selected destination 48.

According to an aspect of the disclosure, the parking module 42 of the PAS 10 receives a selected destination 48, and provide the selected destination to the infrastructure communication module 44. The infrastructure communication module 44 communicates with the selected destination 48 to determine the availability of parking, based on the characteristics of the vehicle 12 and/or driver/occupant(s) provided by the vehicle information module 40. The infrastructure communication module 44 provides the available parking information to the parking module 42.

According to an aspect of the disclosure, the parking module 42 of the PAS 10 receives manual selection from a driver/occupant of at least one selected destination 48, based on driver/occupant preferences. For example, the driver/occupant may prefer a particular selected destination 48 based on prior experience, or proximity to a particular location (e.g., a favorite store). The parking module 42 may be configured to store driver/occupant preferences and/or previous selected destination 48. For example, if the driver/occupant frequents the favorite store at a shopping center, the parking module 42 stores that particular selected destination 48 and the preferred parking location within the selected destination 48 (e.g., a parking lot proximately located to the favorite store at the shopping center surrounded by parking lots).

According to an aspect of the disclosure, the parking module 42 of the PAS 10 receives the selected destination 48 from another device, such as the mobile phone 52, or other portable computer. For example, the driver/occupant may utilize the mobile phone 52 displaying one or more selected destinations 48. The driver/occupant may send (e.g., wired or wirelessly), the selected destination information from the mobile device 52 to the parking module 42, such as via a cable or Wi-Fi.

According to an aspect of the disclosure, the infrastructure communication module 44 of the PAS 10 receives present location information of the vehicle 12 and predicted arrival information for the selected destination 48 from the parking module 42 and based on the location and the prediction, communicates with the selected destination 48 to determine the availability of parking for the vehicle 12. The infrastructure communication module 44 communicates with the selected destination 48 during the travel time to the selected destination 48 to determine any change in the availability of parking for the vehicle 12. If the infrastructure communication module 44 receives a reply from the selected destination 48 that there is no available parking at the selected destination 48, the infrastructure communication module 44 provides that information to the parking module 42.

According to an aspect of the disclosure, the infrastructure communication module 44 of the PAS 10 requests alternate parking locations from the parking module 42 within a predetermined radius of the selected destination 48 and communicate with the alternate parking locations to determine if there is available parking for the vehicle 12 at the alternate parking locations. The infrastructure communication module 44 reconfirms (e.g., rechecks), with the selected destination 48 if the infrastructure communication module 44 receives a reply from the selected destination 48 that no parking is presently available to determine in route if parking does become available at the selected destination 48 and provides that updated information to the parking module 42. If the infrastructure communication module 44 requests parking environment information (e.g., parking configuration type, number and type of disabled parking, etc.), from the selected destination 48 and based on the parking environment information from the selected destination 48 and the characteristics of the vehicle 12 and/or driver/occupant from the vehicle information module 40, the infrastructure communication module 44 determines whether the vehicle 12 and/or the driver/occupant may ingress and/or egress from the parking environment of the selected destination 48.

According to an aspect of the disclosure, the PAS 10 may be configured to store one or more operator/user/driver preferences as to selected destinations and/or parking spaces 20. For example, a preference may be for free parking, street parking, or parking in a structure but underneath at least one level (to shield the vehicle 12 from the weather), or to avoid particularly challenging or other aspects of the parking at the destination (e.g., spiral ramps, tight turns, many columns, unsafe location, dimly lit location). The PAS 10 may be configured to "rate" or assign a degree of difficulty (DoD) for a particular destination (e.g., a parking structure with many columns). The PAS 10 may receive input from the operator regarding the DoD, such as after the vehicle 12 has parked at the selected destination. The input may confirm or rebut the earlier rating or DoD determined or received by the PAS 10 (such as from the cloud). The PAS 10 may be configured to update the rating or DoD based on the operator's inputted evaluation and may upload that information to the cloud and/or social media. Another preference may be directed toward a selected destination, such as a favorite restaurant or store. For example, the selected destination may be a location (e.g., the Mall in Washington, D.C.), and due to the stored preference of a particular coffee shop, the PAS 10 is configured (e.g., via an algorithm), to determine parking locations that are near the Mall and the particular coffee shop. In other words, the PAS 10 is configured to first locate a parking space 20 near the Mall and then additionally filter parking spaces relative to their proximity to the particular coffee shop, as well as the over-arching characteristics of the vehicle 12 and/or the occupants.

Figure 6:
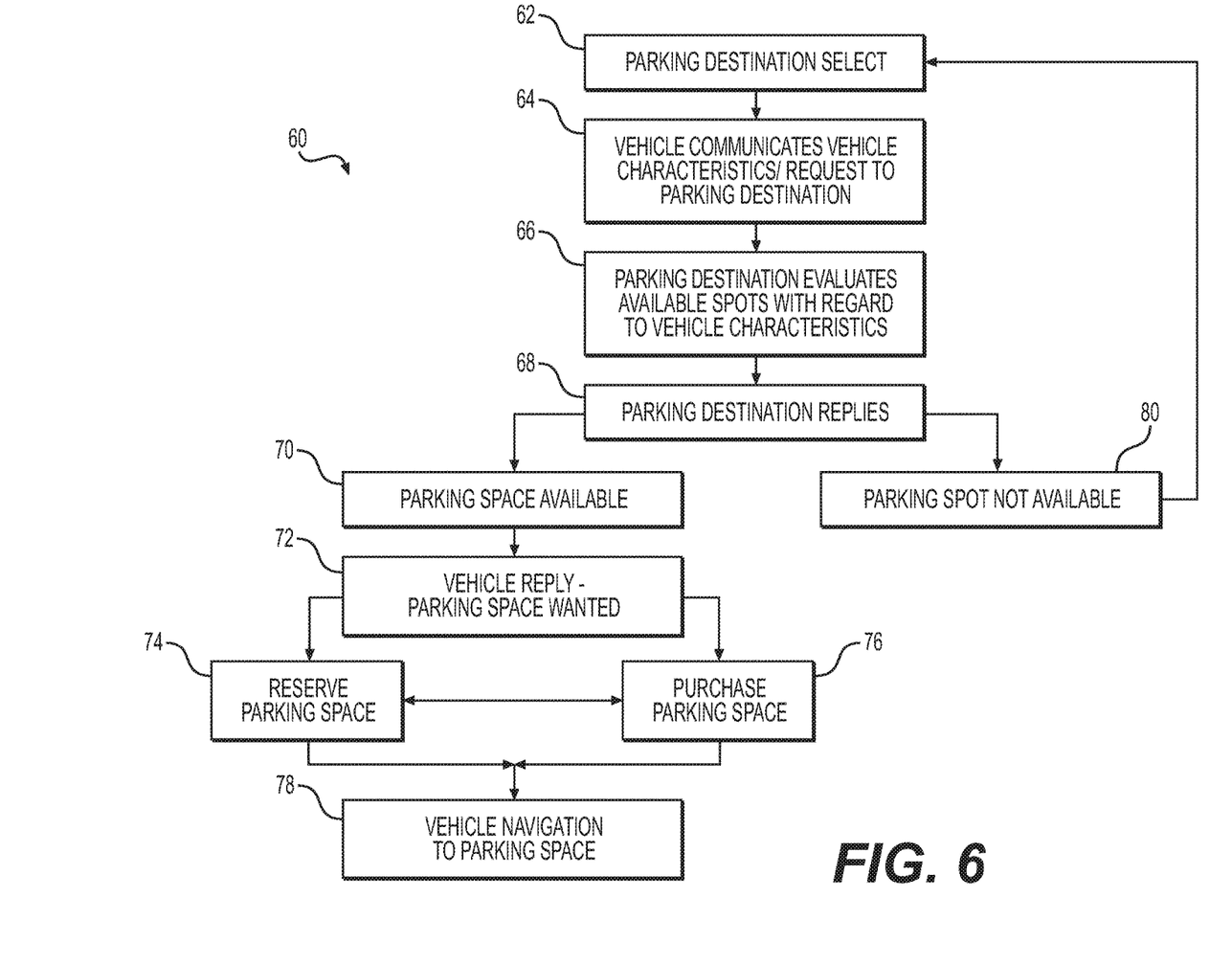
FIG. 6 is a block diagram of a method of the parking availability system in accordance with the present disclosure.

As shown in the flow chart of FIG. 6, the present disclosure includes a method 60 for determining parking availability using the PAS 10.

The method 60 includes step 62, determining parking at the selected destination 48. The parking/destination selection includes using the parking module 42 to select a parking location to solely park the vehicle 12, apart from the selected destination 48 (e.g., a parking structure in an urban area where the selected destination has no or little parking), or a selected destination 48 with its own parking included in the selected destination 48 (e.g., an amusement park).

The method 60 also includes step 64, communicating the vehicle and/or driver/occupant characteristics and requesting parking availability information from the selected destination 48. The vehicle information module 40 provides the characteristics of the vehicle (e.g., length and width), and/or the driver/occupant (e.g., mother with children, cargo/occupants to be loaded/unloaded), to the parking module 42 for the determination of suitable parking at the selected destination 48.

The method also includes step 66, the parking module 42 requesting the infrastructure communication module 44 send a request to the selected destination 48 regarding parking availability information from the selected destination 48. The infrastructure communication module 44 sends the request using the cloud/Internet 54, or other forms and/or methods of communication.

The method also includes step 68, the infrastructure communication module 44 receives a reply from the parking/destination. The reply may include information regarding the status of parking and/or the parking environment at the selected destination 48. For example, status of parking may include number of total spaces, number of available spaces, number of disabled spaces, etc. The parking environment may include height and/or size restrictions, for example.

The method also includes step 70, the PAS 10 receiving a reply via the infrastructure communication module 44 that there is a parking space available sent by the selected destination 48.

The method also includes step 72, the parking module 42 determines, based on the characteristics of the vehicle 12 and/or driver/occupant provided by the vehicle information module 40 and the parking space information received by the infrastructure communication module 44, whether there is a suitable parking at the parking/destination.

The method includes the step 74, reserving a parking space by the parking module 42. An additional/alternative step 76, purchasing a parking space by the parking module 42.

The method includes the step 78 of receiving a reply by the infrastructure communication module 44 that there is not a parking space available based on information obtained from the selected destination 48. The method then returns to step 62, selecting another selected destination 48 with the parking module 42.

Embodiments disclosed herein may be implemented in digital electronic circuitry, or in computer software, firmware, or hardware, including the herein disclosed structures and their equivalents. Some embodiments may be implemented as one or more computer programs, (e.g., one or more modules of computer program instructions), encoded on a tangible computer storage medium for execution by one or more processors. A computer storage medium may be, or may be included in, a computer-readable storage device, a computer-readable storage substrate, or a random or serial access memory. The computer storage medium may also be, or may be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor may include special purpose logic circuitry, e.g., an FPGA (field programmable gate array) or an ASIC (application-specific integrated circuit). The processor also may include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) may be written in any form of programming language, including compiled or interpreted languages, declarative or procedural languages, and the program may be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

To provide for interaction with an individual, the herein disclosed embodiments may be implemented using an interactive display, such as a graphical user interface (GUI). Such GUI's may include interactive features such as pop-up or pull-down menus or lists, selection tabs, scanable features, and other features that may receive human inputs.

The computing system disclosed herein may include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page), to a client device (e.g., for purposes of displaying data to and receiving user input from a user interacting with the client device). Data generated at the client device (e.g., a result of the user interaction), may be received from the client device at the server.

It will be apparent to those skilled in the art that various modifications and variation may be made in the present disclosure without departing from the spirit or scope of the disclosure. Thus, it is intended that the present disclosure cover the modifications and variations of this disclosure provided they come within the scope of the appended claims and their equivalents. Obviously, many modifications and variations of the present disclosure are possible in light of the above teachings and may be practiced otherwise than as specifically described while within the scope of the appended claims.

What is claimed is:

1. A parking availability system for a vehicle comprising:
   a vehicle information module for storing characteristics of the vehicle and/or occupants of the vehicle;
   a parking module for receiving a selected destination and for receiving the characteristics from the vehicle information module; and
   an infrastructure communication module for receiving the selected destination from the parking module and for communicating with the selected destination to request parking availability information,
   wherein the parking module determines, based on the parking availability information and the characteristics, whether there is parking available for the vehicle at the selected destination, and
   wherein if the infrastructure communication module receives a reply from the selected destination that there is no available parking for the vehicle, the infrastructure communication module reconfirms with the selected destination during a travel time of the vehicle to the selected destination to determine if parking becomes available and provides that information to the parking module.

2. The parking availability system of claim 1, wherein the parking module further comprises an electronic payment system and based on the determination of available parking at the selected destination for the vehicle, reserves a parking space for the vehicle at the selected destination and purchases the parking space for the vehicle at the selected destination.

3. The parking availability system of claim 1, wherein the vehicle information module is connected to an imaging device of the vehicle, and uses a captured image of the vehicle to determine the present exterior dimensions of the vehicle and compares the determination of the present exterior dimensions of the vehicle with stored past exterior dimensions and updates the stored exterior dimensions if the present exterior dimensions of the vehicle are different from the stored past exterior dimensions.

4. The parking availability system of claim 1, wherein the vehicle information module is configured to identify one or more occupants of the vehicle based at least on biometric data, electronic device data, or Internet sourced data.

5. The parking availability system of claim 1, wherein the parking module generates alternate parking locations within a predetermined area of the selected destination and provides the alternate parking locations to the infrastructure communications module for the infrastructure communications module to communicate with the alternate parking locations to request parking availability information for the alternate parking locations,
 wherein the infrastructure communications module provides the parking availability information from the alternate parking locations to the parking module, the parking module determines, based on the parking availability information and the characteristics of the vehicle, whether there is parking available for the vehicle at the alternate parking locations.

6. The parking availability system of claim 5, wherein the parking module determines, based on the parking availability information, if there is any charge and/or reservation for the parking space for the vehicle at the alternate parking locations.

7. The parking availability system of claim 1, wherein the parking module determines, based on the selected destination and/or the alternate parking locations and the characteristics of the vehicle, whether ingress and/or egress the parking environment is available to the vehicle may at the selected destination and/or the alternate parking locations.

8. The parking availability system of claim 1, wherein the parking availability system is configured to receive and/or store one or more preferences from the occupants of the vehicle, wherein the preferences include ratings pertaining to aspects of the selected destination.

9. A parking availability system for a vehicle, comprising:
 a vehicle information module for determining and/or storing characteristics of the vehicle and/or occupants of the vehicle;
 a parking module for receiving a selected destination; and
 an infrastructure communication module that receives the selected destination from the parking module and communicates with the selected destination to determine an availability of parking for the vehicle, based on the characteristics provided by the vehicle information module,
 wherein the infrastructure communication module provides available parking information to the parking module,
 wherein the infrastructure communication module receives present vehicle location information and predicted selected destination arrival information from the parking module,
 wherein the infrastructure communication module, based on the location and the prediction, communicates with the selected destination to determine the availability of parking for the vehicle,
 wherein the infrastructure communication module communicates with the selected destination during the time the vehicle is traveling to the selected destination to determine any change in the availability of parking for the vehicle and if the infrastructure communication module receives a reply from the selected destination that there is no available parking for the vehicle, the infrastructure communication module provides that information to the parking module,
 wherein if there is no available parking for the vehicle at the selected destination, the infrastructure communication module receives alternate parking locations from the parking module,
 wherein the infrastructure communication module communicates with the alternate parking locations within a predetermined area of the selected destination to determine if there is available parking for the vehicle at the alternate parking locations, and
 wherein if the infrastructure communication module receives a reply from the selected destination that there is no available parking for the vehicle, the infrastructure communication module reconfirms with the selected destination during the travel time of the vehicle to the selected destination to determine if parking becomes available and provides that information to the parking module.

10. The parking availability system of claim 9, wherein the infrastructure communication module requests, from the selected destination, information pertaining to parking environment at the selected destination.

11. The parking availability system of claim 10, wherein the infrastructure communication module, based on the characteristics and the parking environment at the selected destination, determines whether ingress and/or egress the parking environment is available to the vehicle and/or the occupants at the selected destination.

12. A non-transient computer readable medium containing program instructions for causing a computer for perform the method of:
 receiving a selected destination by a parking module;
 generating, by the parking module, a request to determine an availability of parking at the selected destination;
 sending, by the parking module, the request to an infrastructure communication module;
 communicating, by the infrastructure communication module, with the selected destination to determine the availability of parking at the selected destination; and
 determining, based on the availability of parking at the selected destination and vehicle characteristics stored in a vehicle information module, whether there is parking for the vehicle at the selected destination, wherein, in response to the infrastructure communication module receiving a reply from the selected destination that there is no available parking for the vehicle, the infrastructure communication module reconfirms with the selected destination during a travel time of the vehicle to the selected destination to determine if parking becomes available and provides that information to the parking module.

13. The non-transient computer readable medium containing program instructions of claim 12 further comprising:
 generating, by the parking module, additional requests to determine the availability of parking at the selected destination during the time the vehicle is travelling to the selected destination; and updating, by the infrastructure communication module, the determination of availability of parking at the selected destination based on the additional requests.

14. The non-transient computer readable medium containing program instructions of claim 13 further comprising reserving, by the parking module, a parking space at the selected destination based on the availability of parking at the selected destination.

15. The non-transient computer readable medium containing program instructions of claim 12, further comprising receiving, by the infrastructure communication module, present vehicle location information and predicted selected destination arrival information from the parking module.

16. The non-transient computer readable medium containing program instructions of claim 15, further comprising communicating, by the infrastructure communication module, with the selected destination to determine the availability of parking for the vehicle based on the location and the prediction.

17. The non-transient computer readable medium containing program instructions of claim 12, further comprising communicating, by the infrastructure communication module, with the selected destination during the time the vehicle is traveling to the selected destination to determine any change in the availability of parking for the vehicle and if the infrastructure communication module receives the reply from the selected destination that there is no available parking for the vehicle, the infrastructure communication module provides that information to the parking module.

18. The non-transient computer readable medium containing program instructions of claim 12, further comprising, if there is no available parking for the vehicle at the selected destination, receiving, by the infrastructure communication module, alternate parking locations from the parking module.

19. The non-transient computer readable medium containing program instructions of claim 18, further comprising, communicating, by the infrastructure communication module, with the alternate parking locations within a predetermined area of the selected destination to determine if there is available parking for the vehicle at the alternate parking locations.

* * * * *